Dec. 17, 1968 B. J. WARMAN ET AL 3,417,205

LINKING CIRCUITS FOR SWITCHING EQUIPMENT IN AUTOMATIC TELEPHONE SYSTEMS

Filed June 8, 1965 11 Sheets-Sheet 4

Dec. 17, 1968 B. J. WARMAN ET AL 3,417,205

LINKING CIRCUITS FOR SWITCHING EQUIPMENT IN AUTOMATIC TELEPHONE SYSTEMS

Filed June 8, 1965 11 Sheets-Sheet 7

Dec. 17, 1968 B. J. WARMAN ET AL 3,417,205

LINKING CIRCUITS FOR SWITCHING EQUIPMENT IN AUTOMATIC TELEPHONE SYSTEMS

Filed June 8, 1965 11 Sheets-Sheet 8

3,417,205

LINKING CIRCUITS FOR SWITCHING EQUIPMENT IN AUTOMATIC TELEPHONE SYSTEMS

Bloomfield James Warman, Charlton, London, and John Herbert Marshall, Bexleyheath, Kent, England, assignors to Associated Electrical Industries Limited, London, England, a company of Great Britain Filed June 8, 1965, Ser. No. 462,179
Claims priority, application United Kingdom, June 17, 1964, 25,080/64
4 Claims. (Cl. 179—22)

ABSTRACT OF THE DISCLOSURE

In an automatic telephone exchange system in which interconnections between lines are established through switching equipment by means of communication paths each comprising an outgoing portion extending between one line through the switching equipment to one side of a link circuit and an incoming portion which extends from the other side of the link circuit back through the switching equipment to another line, the provision of a plurality of link circuit means each comprising a plurality of individual but dissimilar link circuits together with switching means for selectively connecting an individual link circuit of said link circuit means to the incoming and outgoing portions of a communication path, the particular link circuit chosen being determined by the type of call for which the communication path is taken into use.

Figure 1:
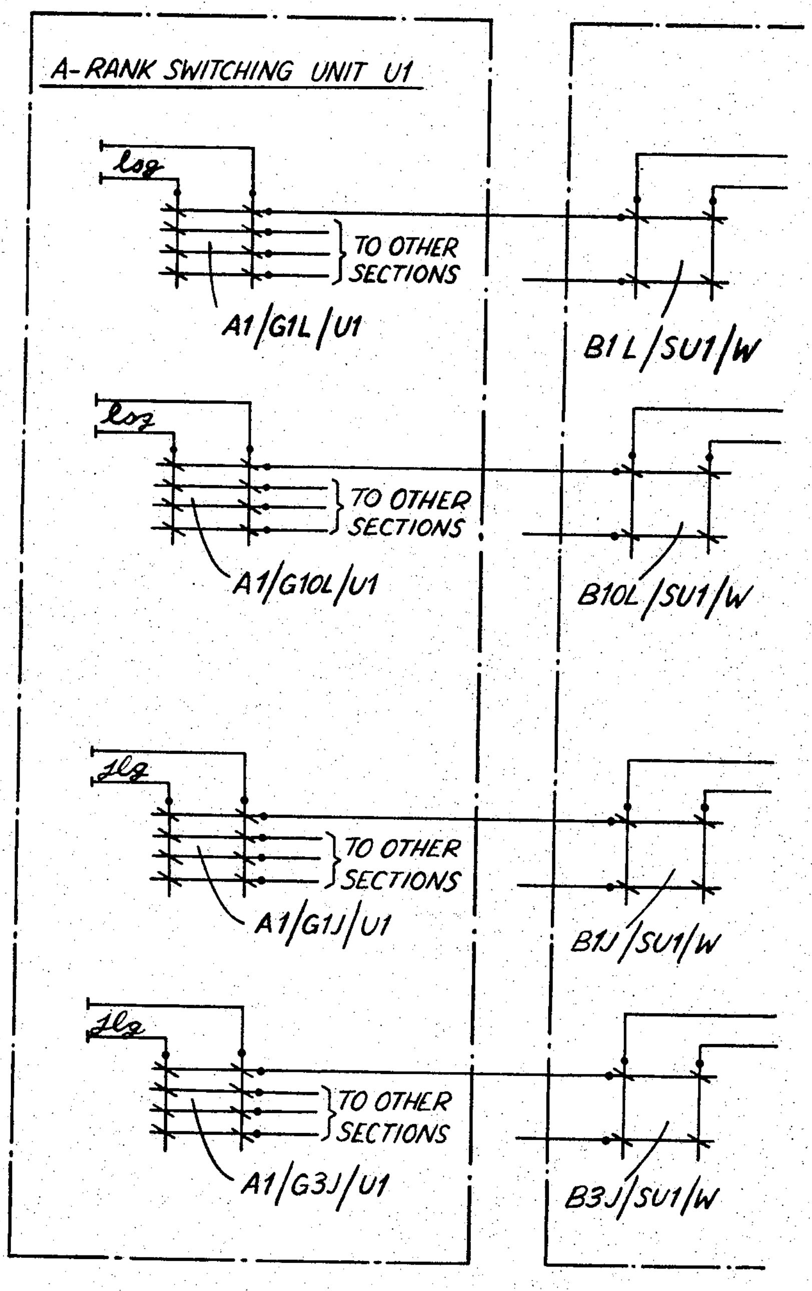
Figure 2:
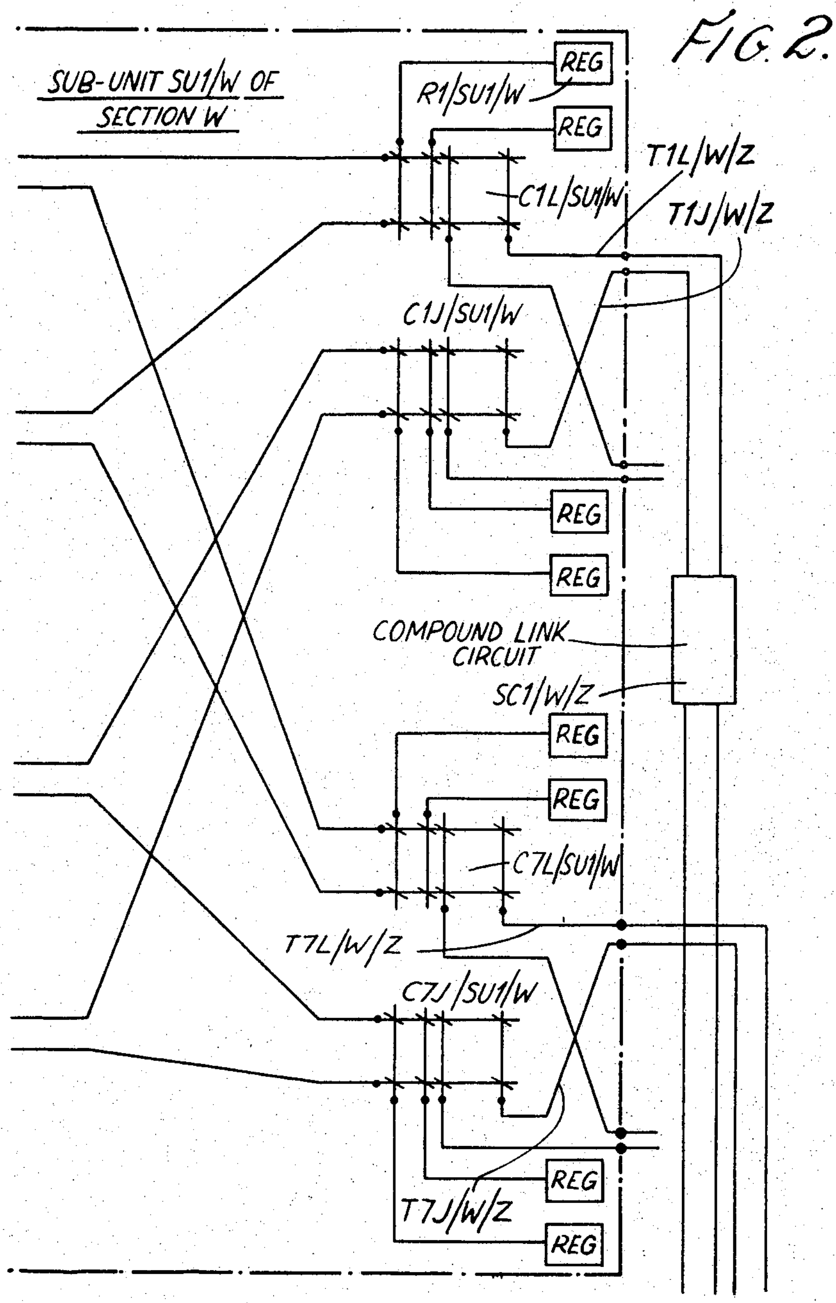
Figure 3:
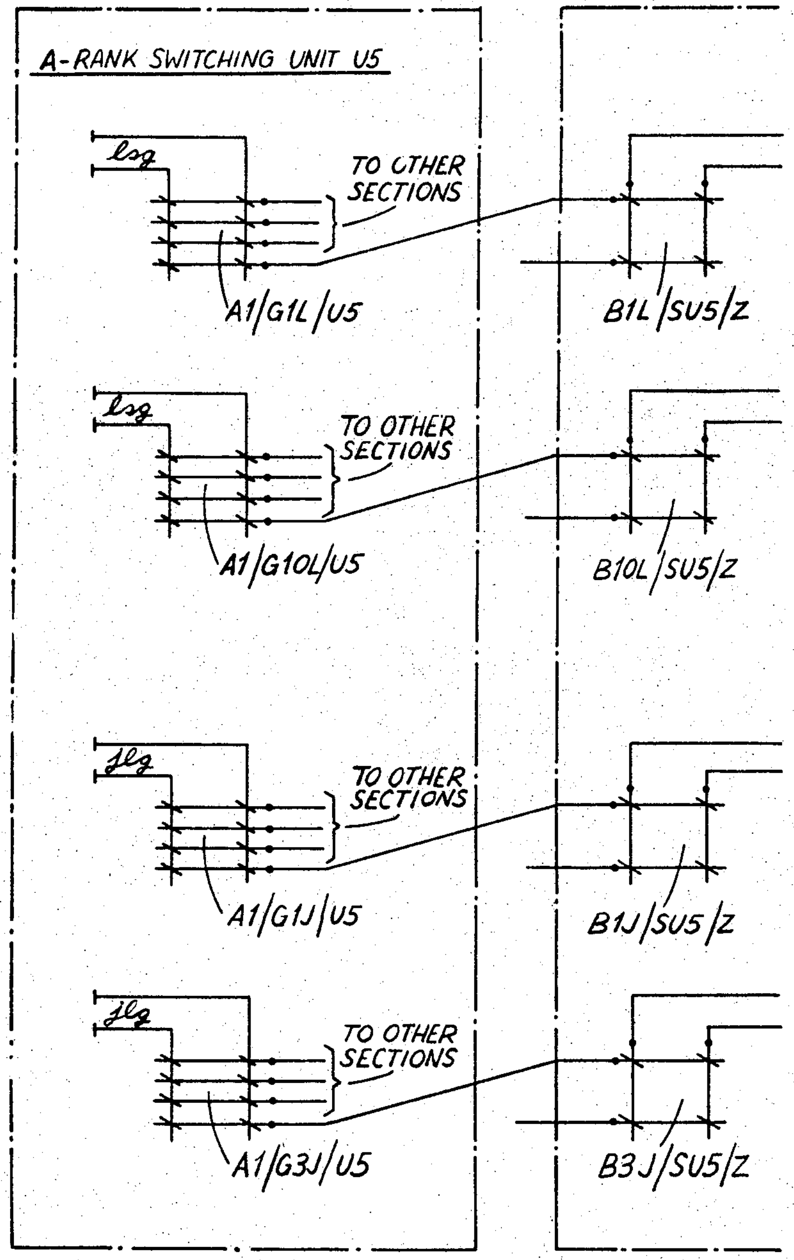
Figure 4:
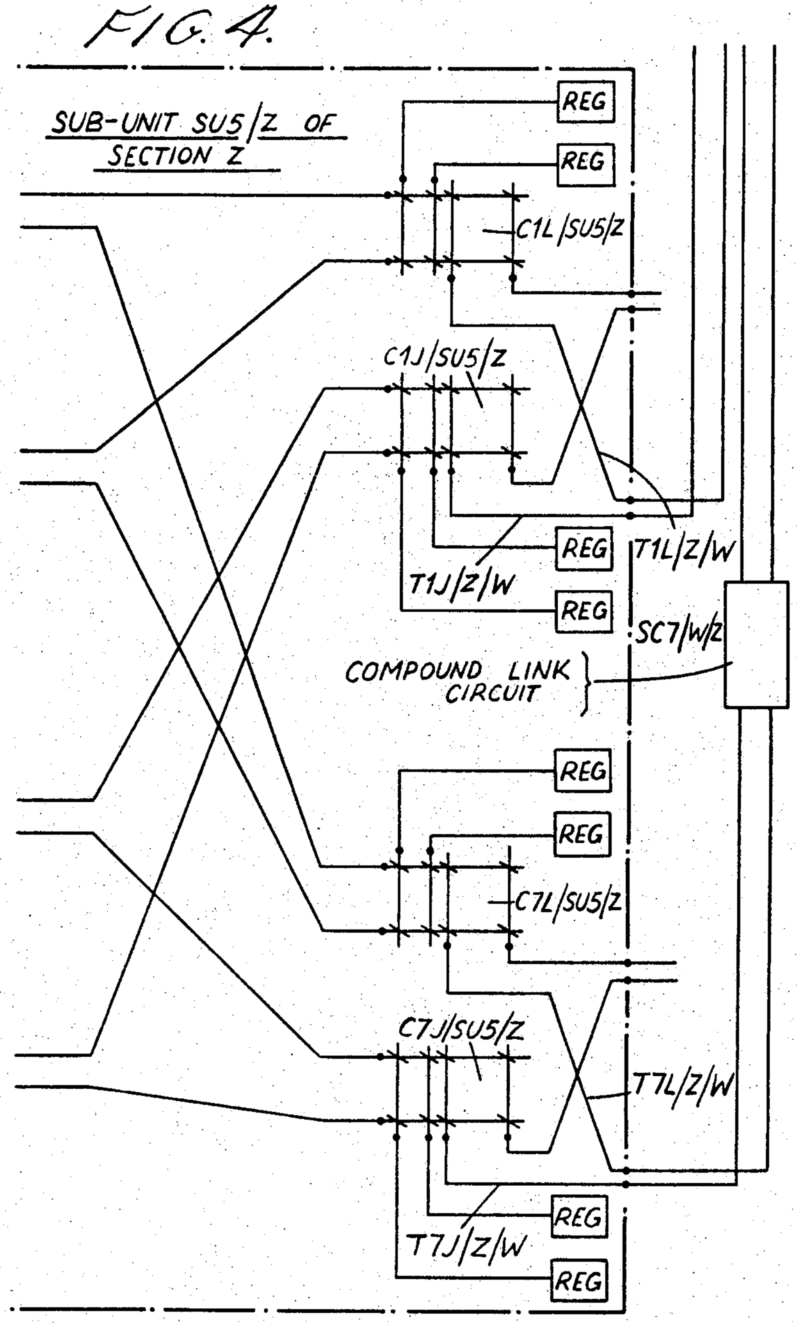

This invention relates to automatic telephone exchange systems.

In the specification accompanying B. J. Warman's patent application Ser. No. 122,137 filed July 6, 1961 now Patent No. 3,272,924 there is described an invention involving the concept of so-called "sectionalisation" in automatic exchange design. Basically, and in general terms, this concept is to provide the switching equipment, which in an automatic exchange permits the selective establishment of communication paths between lines connected to the exchange, in a plurality of sections which together afford between any two of said lines, through the switching equipment, a plurality of possible communication paths of which the incoming portions are respectively afforded by various ones of said sections and the outgoing portions are likewise afforded by various ones of these sections, and to provide also a section selecting arrangement which in respect of a call between two lines, and on the basis of information fed to it as to pertinent conditions relative to the several sections, is operable to cause the establishment of a connection between said two lines over such one of the possible communication paths (afforded by the sections as aforesaid) as will give best advantage having regard to said conditions.

Hereinafter, the terms "section" and "sections" will be used to mean one or some or all (as the case may be) of the sections in which switching equipment at an automatic telephone exchange is provided in accordance with the concept referred to.

A form of automatic telephone exchange system which embodies the concept referred to, and which employs coordinate switching arrays preferably (but not necessarily) constituted by cross-point arrays using reed relays, is described in the Specification accompanying B. J. Warman's patent application Ser. No. 160,174 filed Dec. 18, 1961 now Patent No. 3,214,524. This particular form of automatic telephone exchange system embodying the concept referred to is one in which the switching equipment at an automatic telephone exchange is arranged so that in general, as regards any complete communication path, through the switching equipment, between any two lines connected to the exchange, the path involves two of the sections, namely a section affording an incoming portion of the path and a different section affording an outgoing portion of the path, said two portions of the path being linked by way of a link circuit ("link path"). A link circuit serving local calls includes a supervisory transmission bridge arrangement to which supervision is transferred once a call for which the link circuit is taken into use has been set up or has encountered a busy condition of the called line. On the other hand, a link circuit serving outgoing junction calls does not need to include a supervisory transmission bridge arrangement, the reason for this being that the necessary supervisory transmission bridge arrangements for outgoing junction calls are included in the outgoing junction equipments.

The present invention provides a compound link circuit which, in an important application of the invention, enables an advantageous modification of the form of automatic telephone exchange system just mentioned to be achieved, a main advantage of the modification being that it results in a reduction in the amount of switching equipment required to give the traffic of the exchange access to the link circuits of the exchange.

According to a main feature of the invention, there is provided (in or for an automatic telephone exchange in which the communication path set up through the exchange for a call involving the exchange comprises incoming and outgoing portions established through switching ranks and linked by way of a link circuit) a compound link circuit comprising in combination a plurality of dissimilar constituent link circuits and switching means whereby each of these constituent link circuits can be selectively connected individually on one of its two sides to any one of a first plurality of communication path terminal trunks connected to the compound link circuit and can be selectively connected individually on the other of its two sides to any one of a second plurality of communication path terminal trunks connected to the compound link circuit, and whereby accordingly any one of said first plurality of communication path terminal trunks and any one of said second plurality of communication path terminal trunks can in respect of a call be selectively connected to be linked together by way of the particular one of the constituent link circuits that is of the kind appropriate to the call concerned, the compound link circuit as a whole being such that in suitable circumstances it can be in use, providing requisite link circuits, on a plurality of calls at the same time.

In the case of the particular applications of the invention which are at present especially envisaged, a compound link circuit comprises (i) a constituent link circuit which includes a supervisory transmission bridge arrangement, and (ii) a constituent link circuit which is a "through" link circuit not including such a bridge arrangement, and (iii) switching means whereby each of these constituent link circuits can be selectively connected individually on one of its two sides to either trunk of a first pair of communication path terminal trunks connected to the compound link circuit and can be selectively connected individually on the other of its two sides to either trunk of a second pair of communication path terminal trunks connected to the compound link circuit, each said pair of communication path terminal trunks comprising a terminal trunk pertaining to switching equipment serving local subscribers' lines and a terminal trunk pertaining to switching equipment serving junction lines.

Figure 8:
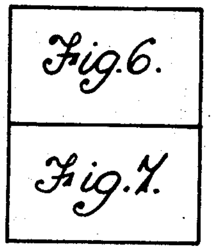
Figure 13:
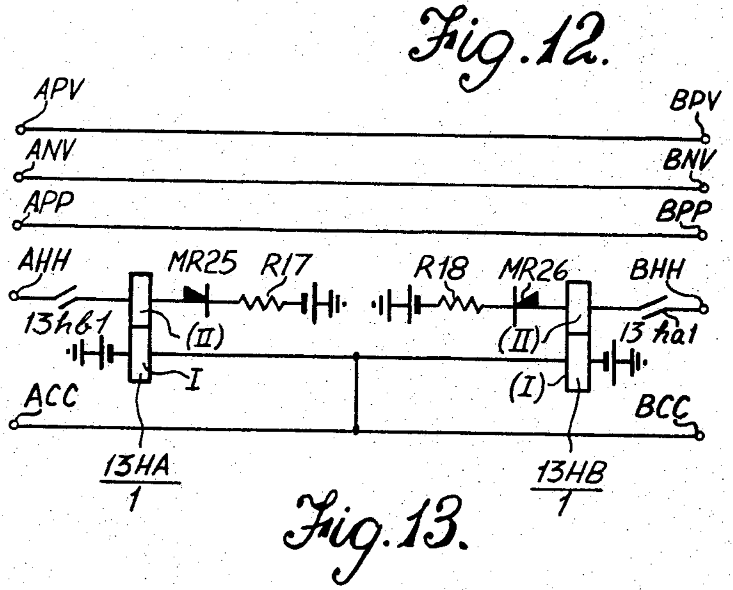
Figure 6:
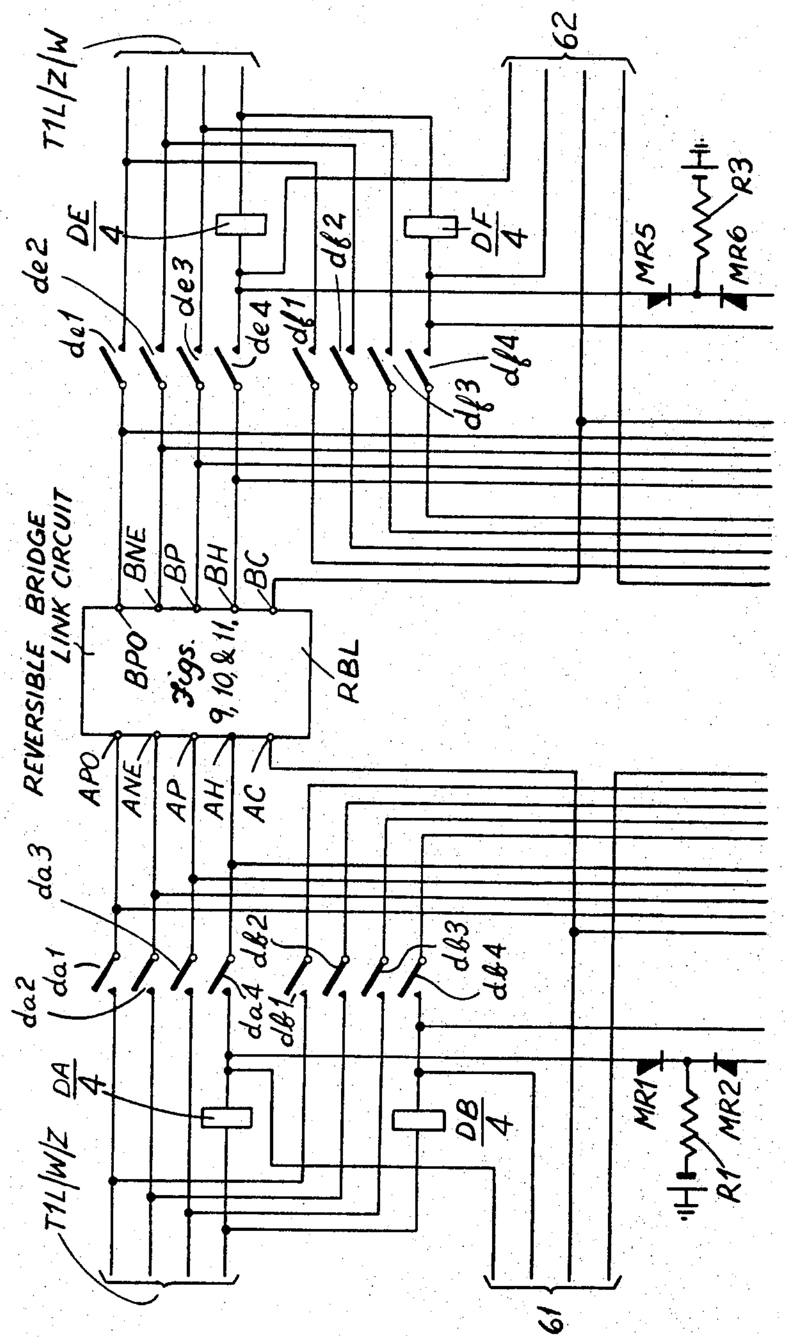
Figure 7:
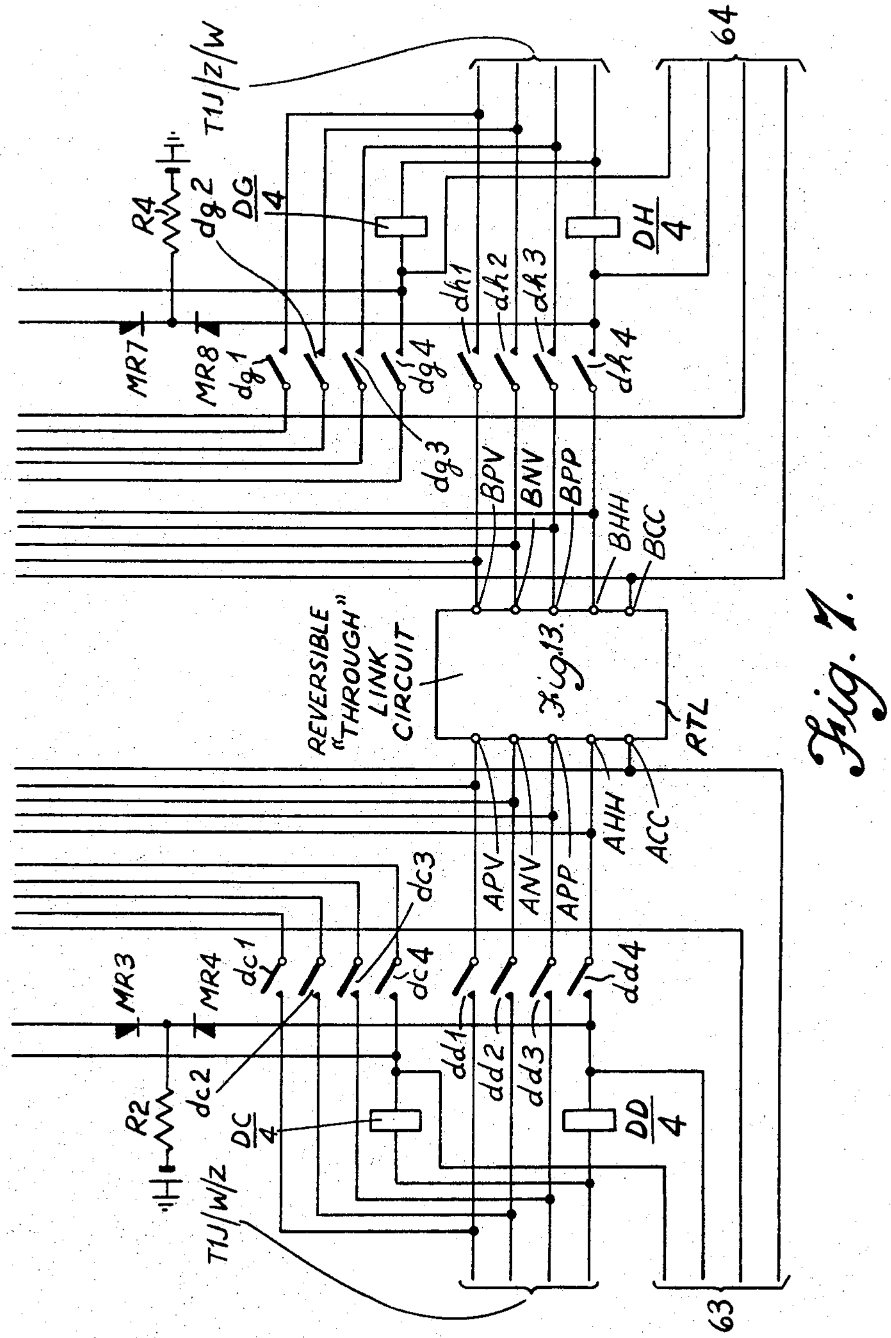
Figure 9:
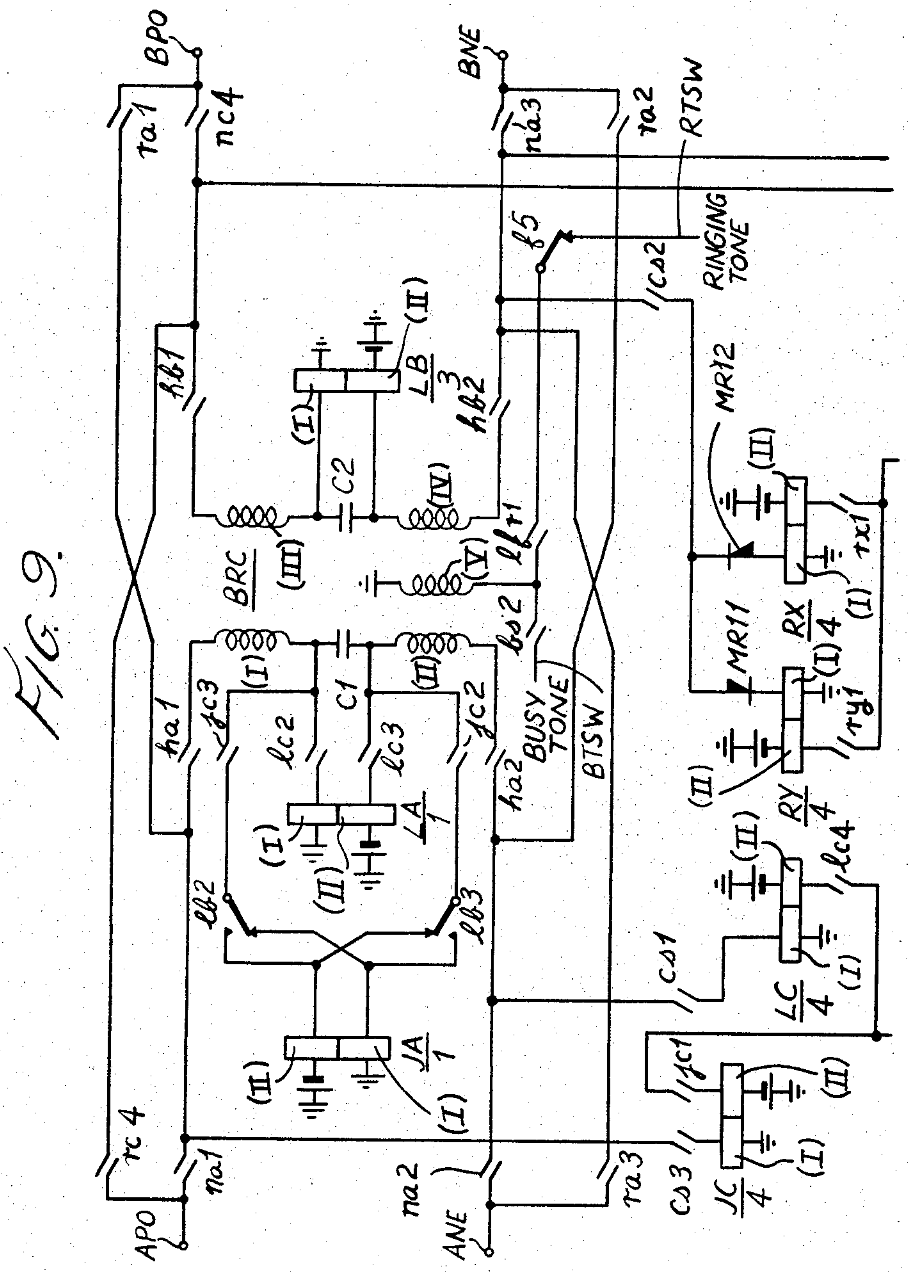
Figure 10:
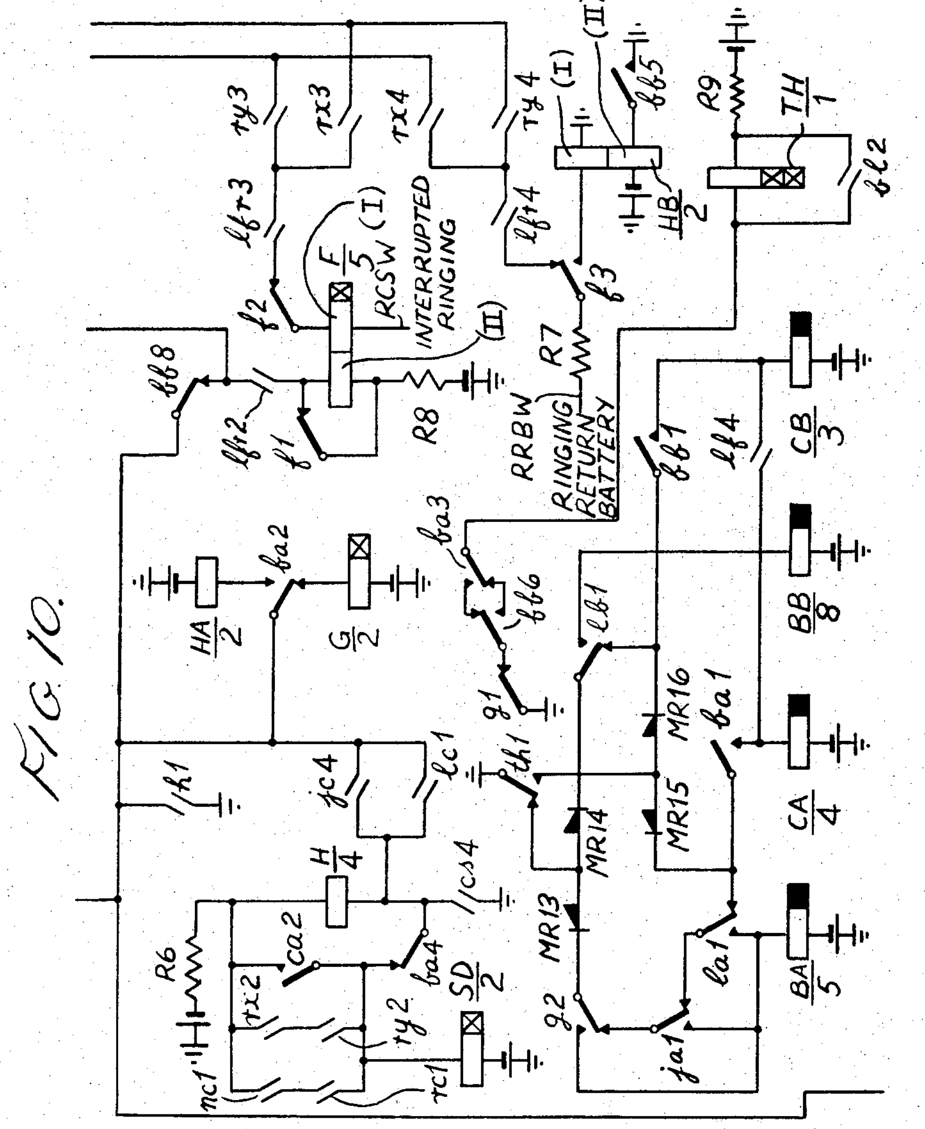
Figure 11:
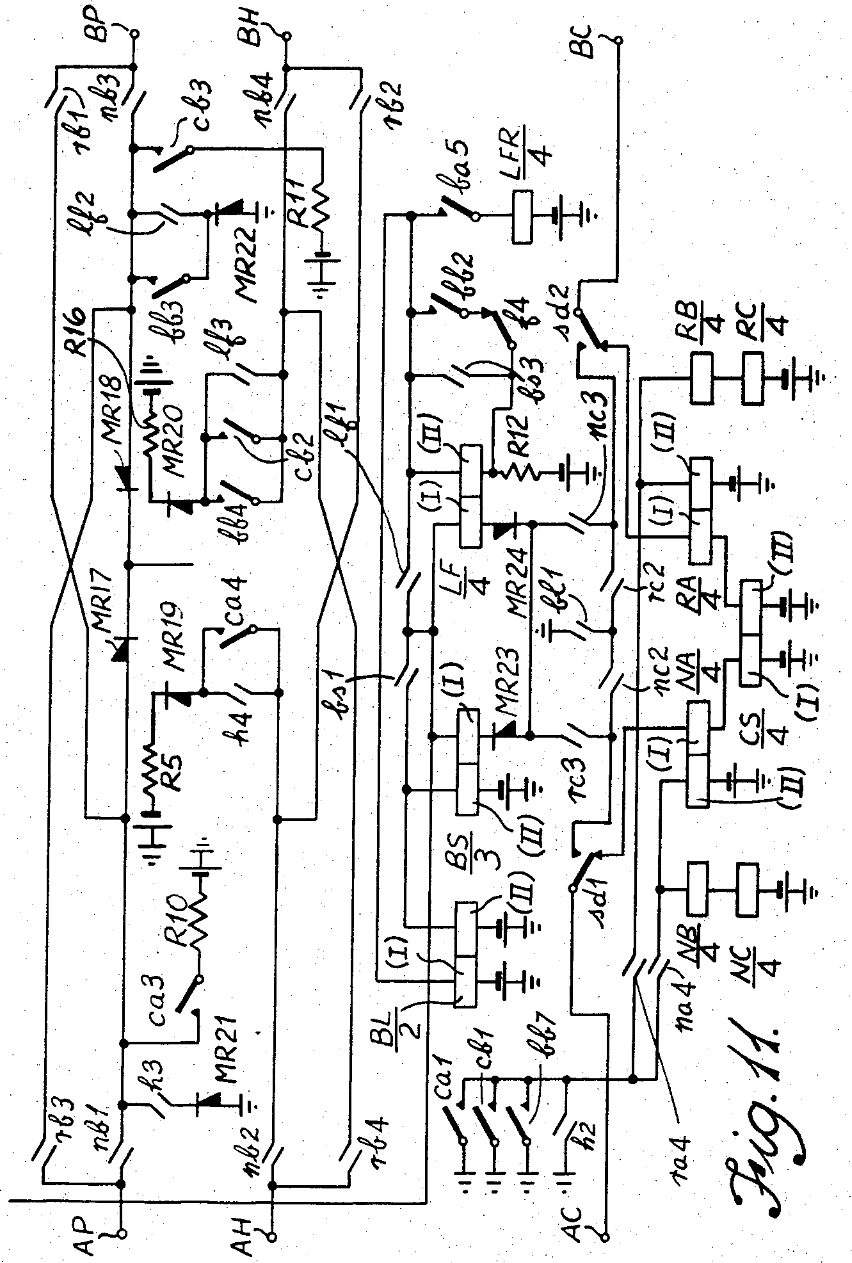
Figure 14:
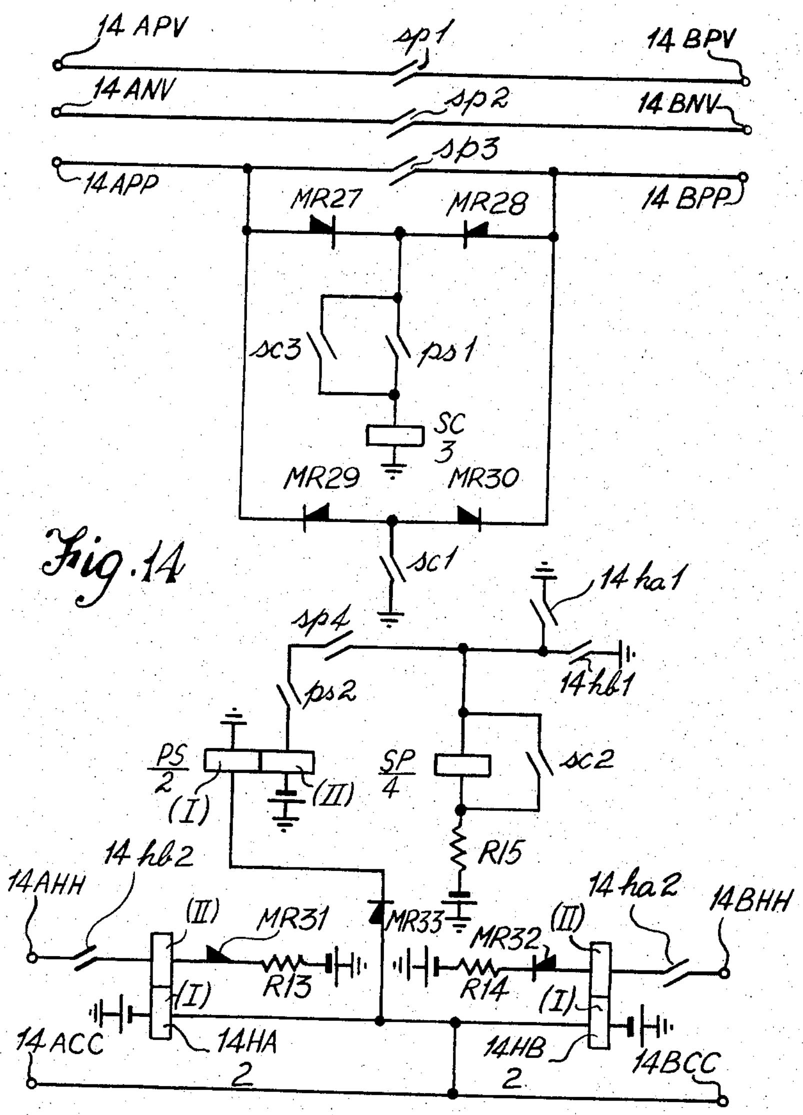

The nature of the invention will be more clearly understood from the description which will now be given with reference to the accompanying drawings. FIGS. 1 to 4 of these drawings together constitute, when assembled in the manner shown in FIG. 5, a schematic trunking diagram pertaining to an automatic telephone exchange embodying the present invention. FIGS. 6 and 7 together constitute, when assembled in the manner shown in FIG. 8, a diagram (partly in block form) showing the constitution and organization of a form of compound link circuit used in the arrangements illustrated in the trunking diagram just referred to. FIGS. 9, 10 and 11 together constitute, when assembled in the manner shown in FIG. 12, a circuit diagram illustrating the form taken by a reversible bridge link circuit included in the compound link circuit of FIGS. 6 and 7, and FIG. 13 is a circuit diagram illustrating the form taken by a reversible "through" link circuit included in this compound link circuit. FIG. 14 is a circuit diagram illustrating an alternative form of reversible "through" link circuit for use in a compound link circuit according to the invention.

Figure 5:
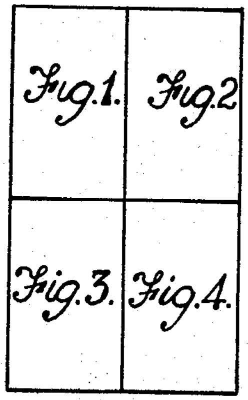

Referring firstly to FIGS. 1 to 4 (which as just indicated should be viewed assembled in the manner shown in FIG. 5), the schematic trunking diagram constituted by these figures shows certain typical co-ordinate switching arrays of three switching ranks. The typical switching arrays shown are eight arrays A1/G1L/U1, A1/G10L/U1, . . . A1/G1J/U5, and A1/G3J/U5 of a first or A rank, eight arrays B1L/SU1/W, B10L/SU1/W, . . . B1J/SU5/Z, and B3J/SU5/Z of a second or B rank, and eight arrays C1L/SU1/W, C1J/SU1/W, . . . C7L/SU5/Z, and C7/SU5/Z of a third or C rank. The switching arrays of the A rank are divided into a plurality of A-rank switching units only two of which, namely unit U1 and unit U5, are represented in the diagram. Each A-rank switching unit comprises, in the exemplary case for which the diagram is drawn and designated, ten groups of switching arrays serving local subscribers' lines, and three groups of switching arrays serving junction lines. Each group of A-rank switching arrays serving local subscribers' lines contains a number of switching arrays that is the same for all such groups, and each group of A-rank switching arrays serving junction lines contains a number of switching arrays that is the same for all such groups. Of the four typical switching arrays of A-rank switching unit U1 which are represented in the diagram, the array A1/G1L/U1 is the first array of the first group of, and the array A1/G10L/U1 is the first array of the tenth group of, the switching arrays of this unit that serve local subscribers' lines, while the array A1/G1J/U1 is the first array of the first group of, and the array A1/G3J/U1 is the first array of the third group of, the switching arrays of this unit that serve junction lines. Correspondingly, of the four typical switching arrays of A-rank switching unit U5 which are represented in the diagram, the array A1/G1L/U5 is the first array of the first group of, and the array A1/G10L/U5 is the first array of the tenth group of, the switching arrays of this unit that serve local subscribers' lines, while the array A1/G1J/U5 is the first array of the first group of, and the array A1/G3J/U5 is the first array of the third group of, the switching arrays of this unit that serve junction lines. Each of the switching arrays such as A1/G1L/U1, A1/G10L/U1, A1/G1L/U5 and A1/G10/U5 serves a sub-group *lsg* of the subscribers' lines connected to the exchange, and each of the switching arrays such as A1/G1J/U1, A1/G3J/U1, A1/G1J/U5, and A1/G3J/U5 serves a sub-group *jlg* of the junction lines connected to the exchange.

The switching arrays of the second and third, or B and C, ranks are provided in four sections W, X, Y and Z, all of which are identical as regards the provision and interconnection of switching arrays therein. The B-rank and C-rank switching arrays are divided into as many units as there are A-rank switching units, the B-rank and C-rank arrays included in the several units in each section forming sub-units. Only two typical such sub-units are represented in the diagram, namely sub-unit SU1/W of section W and sub-unit SU5/Z of section Z. Each such sub-unit comprises, in the exemplary case for which the diagram is drawn and designated, ten B-rank switching arrays serving local subscribers' lines, three B-rank switching arrays serving junction lines, seven C-rank switching arrays serving local subscribers' lines, and seven C-rank switching arrays serving junction lines. Of the eight typical switching arrays of sub-unit SU1/W which are represented in the diagram, the arrays B1L/SU1/W and B10L/SU1/W are the first and tenth ones respectively of the ten B-rank switching arrays of this sub-unit that serve local subscribers' lines, the arrays B1J/SU1/W and B3J/SU1/W are the first and third ones respectively of the three B-rank switching arrays of this sub-unit that serve junction lines, the arrays C1L/SU1/W and C7L/SU1/W are the first and seventh ones respectively of the seven C-rank switching arrays of this sub-unit that serve local subscribers' lines, and the arrays C1J/SU1/W and C7J/SU1/W are the first and seventh ones respectively of the seven C-rank switching arrays of this sub-unit that serve junction lines. Correspondingly, of the eight typical switching arrays of sub-unt SU5/Z which are represented in the diagram, the arrays B1L/SU5/Z and B10L/SU5/Z are the first and tenth ones respectively of the ten B-rank switching arrays of this sub-unit that serve local subscribers' lines, the arrays B1J/SU5/Z and B3J/SU5/Z are the first and third ones respectively of the three B-rank switching arrays of this sub-unit that serve junction lines, the arrays C1L/SU5/Z and C7L/SU5/Z are the first and seventh ones respectively of the seven C-rank switching arrays of this sub-unit that serve local subscribers' lines, and the arrays C1J/SU5/Z and C7J/SU5/Z are the first and seventh ones respectively of the seven C-rank switching arrays of this sub-unit that serve junction lines. The number of horizontal multi-conductor connections in each B-rank switching array (such as B1L/SU1/W) that serves local subscribers' lines is the same as the number of switching arrays in each group of A-rank switching arrays serving local subscribers' lines, and this enables the overall scheme of interconnection between the A-rank and B-rank arrays serving local subscribers' lines to be organized on an orderly basis. Likewise, the number of horizontal multi-conductor connections in each B-rank switching array (such as B1J/SU1/W) that serves junction lines is the same as the number of switching arrays in each group of A-rank switching arrays serving junction lines, and this enables the overall scheme of interconnection between the A-rank and B-rank arrays serving junction lines to be organised on an orderly basis. In each sub-unit, the B-rank and C-rank switching arrays included in the sub-unit and serving local subscribers' lines are interconnected in such a manner that, as regards these particular arrays, each B-rank array has access to each C-rank array and each C-rank array has access to each B-rank array. Correspondingly, in each sub-unit, the B-rank and C-rank switching arrays included in the sub-unit and serving junction lines are interconnected in such a manner that, as regards these particular arrays, each B-rank array has access to each C-rank array and each C-rank array has access to each B-rank array.

Certain of the vertical multi-conductor connections of each C-rank switching array give access to individual registers such as R1/SU1/W. The remaining vertical multi-conductor connections of each C-rank switching array are connected to communication path terminal trunks that are connected to compound link circuits. Only two typical such link circuits, namely compound link circuit SC1/W/Z and compound link circuit SC7/W/Z, are represented in the diagram. Each compound link circuit comprises (as will be dealt with more fully later on in this specification) a constituent link circuit which is a reversible bridge link circuit, a constituent link circuit which is a reversible "through" link circuit, and switching means whereby each of these constituent link circuits can be selectively connected individually on one of its two sides to either trunk of a first pair of communication path terminal trunks connected to the compound link circuit and can be selectively connected individually on the other of its two sides to either trunk of a second pair of communication path terminal trunks connected to the compound link circuits, and whereby accordingly either trunk of said first pair and either trunk of said second pair can in respect of a call be selectively connected to be linked together by way of the particular one of the constituent link circuits that is of the kind appropriate to the call concerned. Each of the two pairs of communication path terminal trunks connected to a compound link circuit comprises a terminal trunk connected to a vertical multi-conductor connection of a C-rank switching array serving local subscribers' lines, and a terminal trunk connected to a vertical multi-conductor connection of a C-rank switching array serving junction lines. One of the two pairs of communication path terminal trunks connected to a compound link circuit comprises terminal trunks connected to vertical multi-conductor connections of C-rank switching arrays included in one sub-unit of a section, and the other of these two pairs comprises terminal trunks connected to vertical multi-conductor connections of C-rank switching arrays included in one sub-unit of a different section. Each compound link circuit is such that in suitable circumstances it can be in use, providing requisite link circuits, on two calls at the same time. Of the two typical compound link circuits which are represented in the diagram, the compound link circuit SC1/W/Z has connected to it a first pair of communication path terminal trunks comprising a terminal trunk T1L/W/Z pertaining to switching array C1L/SU1/W and a terminal trunk T1J/W/Z pertaining to switching array

C1J/SU1/W, and has connected to it a second pair of communication path terminal trunks comprising a terminal trunk

T1L/Z/W pertaining to switching array C1L/SU5/Z and a terminal trunk T1J/Z/W pertaining to switching array C1J/SU5/Z. The compound link circuit SC7/W/Z has connected to it a first pair of communication path terminal trunks comprising a terminal trunk T7L/W/Z pertaining to switching array C7L/SU1/W and a terminal trunk T7J/W/Z pertaining to switching array C7J/SU1/W, and has connected to it a second pair of communication path terminal trunks comprising a terminal trunk T7L/Z/W pertaining to switching array C7L/SU5/Z and a terminal trunk T7J/Z/W pertaining to switching array C7J/SU5/Z. Dealing now by way of example with various kinds of call on which the compound link circuit SC1/W/Z can be used, it can be used on a local call from a subscriber's line connected to A-rank switching unit U1 to a subscriber's line connected to A-rank switching unit U5, in which case its constituent reversible bridge link circuit in its non-reversed condition and terminal trunks T1L/W/Z and T1L/Z/W are involved. It can be used on a local call from a subscriber's line connected to A-rank switching unit U5 to a subscriber's line connected to A-rank switching unit U1 in which case its constituent reversible bridge link circuit in its reversed condition and terminal trunks T1L/Z/W and T1L/W/Z are involved. It can be used on a transit call from an incoming junction line connected to A-rank switching unit U1 to an outgoing junction line connected to A-rank switching unit U5, in which case its constituent reversible "through" link circuit (the reversibility of which resides in the similarity of its two sides) and termnal trunks T1J/W/Z and T1J/Z/W are involved. It can be used on a transit call from an incoming junction line connected to A-rank switching unit U5 to an outgoing junction line connected to A-rank switching unit U1, in which case its constituent reversible "through" link circuit and terminal trunks T1J/Z/W and T1J/W/Z are involved. It can be used on a call from an incoming junction line connected to A-rank switching unit U1 to a subscriber's line connected to A-rank switching unit U5, in which case its constituent reversible bridge link circuit in its non-reversed condition and terminal trunks T1J/W/Z and T1L/Z/W are involved. It can be used on a call from an incoming junction line connected to A-rank switching unit U5 to a subscriber's line connected to A-rank switching unit U1, in which case its constituent reversible bridge link circuit in its reversed condition and terminal trunks T1J/Z/W and T1L/W/Z are involved. It can be used on a call from a subscriber's line connected to A-rank switching unit U1 to an outgoing junction line connected to A-rank switching unit U5, in which case its constituent reversible "through" link circuit and terminal trunks T1L/W/Z and T1J/Z/W are involved. It can be used on a call from a subscriber's line connected to A-rank switching unit U5 to an outgoing junction line connected to A-rank switching unit U1, in which case its constituent reversible "through" link circuit and terminal trunks T1L/Z/W and T1J/W/Z are involved.

Referring now to FIGS. 6 and 7 (which as already indicated should be viewed assembled in the manner shown in FIG. 8), the diagram constituted by these figures, which is partly in block form, shows the constitution and organisation of the form of compound link circuit used in the arrangement just described with reference to FIGS. 1 to 4. For ease of description and understanding, it will be assumed that the particular compound link circuit shown in the diagram is the compound link circuit SC1/W/Z already referred to, and in the diagram the four communication path terminal trunks concerned have been designated in accordance with this assumption. These four trunks are, of course, those designated T1L/W/Z, T1L/Z/W, T1J/W/Z, and T1J/Z/W. The four trunks designated 61, 62, 63 and 64 are not communication path trunks but are trunks connected to marking apparatus. The compound link circuit comprises a constituent reversible bridge link circuit RBL, a constituent reversible "through" link circuit RTL, switching means in the form of eight relays DA to DH, and twelve components, comprising eight rectifiers MR1 to MR8 and four resistors R1 to R4, that are concerned in the formation of interrogation input circuits for the trunks 61 to 64. When the compound link circuit is used on a local call from a subscriber's line connected to A-rank switching unit U1 to a subscriber's line connected to A-rank switching unit U5, or on a local call from a subscriber's line connected to A-rank switching unit U5 to a subscriber's line connected to A-rank switching unit U1, relays DA and DE are operated and by the closing of their contacts *da*1 to *da*4 and *de*1 to *de*4 cause trunks T1L/W/Z and T1L/Z/W to be connected to be linked together by way of the reversible bridge link circuit RBL. At the same time as the compound link circuit is being so used, it can be used on a transit call from an incoming junction line connected to A-rank switching unit U1 to an outgoing junction line connected to A-rank switching unit U5, or on a transit call from an incoming junction line connected to A-rank switching unit U5 to an outgoing junction line connected to A-rank switching unit U1. When the compound link circuit is used on a transit call, relays DD and DH are operated and by the closing of their contacts *dd*1 to *dd*4 and *dh*1 to *dh*4 cause trunks T1J/W/Z and T1J/Z/W to be connected to be linked together by way of the reversible "through" link circuit RTL. When the compound link circuit is used on a call from an incoming junction line connected to A-rank switching unit U1 to a subscriber's line connected to A-rank switching unit U5, relays DC and DE are operated and by the closing of their contacts *dc*1 to *dc*4 and *de*1 to *de*4 cause trunks T1J/W/Z and T1L/Z/W to be connected to be linked together by way of the reversible bridge link circuit RBL. At the same time as the compound link circuit is being so used, it can be used on a call from a subscriber's line connected to A-rank switching unit U1 to an outgoing junction line connected to A-rank switching unit U5, relays DB and DH being operated to cause (by the closing of their contacts *db*1 to *db*4 and *dh*1 to *dh*4) trunks T1L/W/Z and T1J/Z/W to be linked together by way of the reversible "through" link circuit RTL. When the compound link circuit is used on a call from an incoming junction line connected to A-rank switching unit U5 to a subscriber's line connected to A-rank switching unit U1, relays DA and DG are operated and by the closing of their contacts *da*1 to *da*4 and *dg*1 to *dg*4 cause trunks T1L/W/Z and T1J/Z/W to be connected to be linked together by way of the reversible bridge link circuit RBL. At the same time as the compound link circuit is being so used, it can be used on a call from a subscriber's line connected to A-rank switching unit U5 to an outgoing junction line connected to A-rank switching unit U1, relays DD and DF being operated to cause (by the closing of their contacts *dd*1 to *dd*4 and *df*1 to *df*4) trunks T1J/W/Z and T1L/Z/W to be linked together by way of the reversible "through" link circuit RTL.

Figure 12:
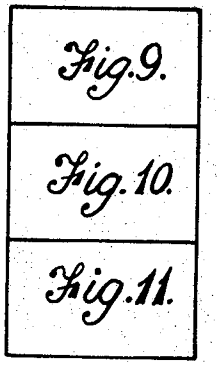

Referring now to FIGS. 9, 10 and 11 (which as already indicated should be viewed assembled in the manner shown in FIG. 12), the circuit diagram constituted by these figures illustrates the form taken by the constituent reversible bridge link circuit RBL of the compound link circuit of FIGS. 6 and 7. This link circuit includes a supervisory transmission bridge arrangement which includes a repeating coil BRC and capacitors C1 and C2. The repeating coil BRC has five windings (I) to (V).

Dealing firstly with the operation of the reversible bridge link circuit when it is taken into use for a local call from a subscriber's line connected to A-rank switching unit U1 (FIG. 1) to a subscriber's line connected to A-rank switching unit U5 (FIG. 3), that is, is taken into use for a local call on which it is to be used in its non-reversed condition, in this case reed relays NA and CS are operated on their windings (I) upon the taking of the link circuit into use. The operation of relays NA and CS results from the receipt at the link circuit, by way of terminal AC, of a seizing signal in the form of an earth condition lasting about 10 milliseconds. The operating circuit includes back contact *sd*1. The closing of contact *cs*4 operates reed relay H in an obvious circuit including a resistor R6, and completes an energising circuit over contact *ba*4 for a slow-operating relay SD. The operating lag of relay SD is of sufficient duration (e.g. of the order of 15 milliseconds) to cause the operation of the relay to be delayed until after the termination of the seizing signal. The closing of contact *h*1 completes an energising circuit over back contact *ba*2 for a slow-operating relay G. The closing of contact *h*2 completes a circuit over contact *na*4 for operating two reed relays NB and NC and for energising the holding winding (II) of relay NA. The closing of contact *nb*1 completes a circuit, including a rectifier MR21 and contact *h*3, for applying a busying earth condition to private-wire terminal AP. The closing of contact *nb*2 completes a circuit, including a resistor R5, a rectifier MR19, and contact *h*4, for applying a holding condition to holding-wire terminal AH. During the last half of the period of duration of the seizing signal, reed relay LC is operated on its operating winding (I). The operation of relay LC results from the receipt at the link circuit, by way of negative-wire terminal ANE, of a class-of-call signal in the form of a negative battery condition lasting about 5 milliseconds and concurrent with the last half of the seizing signal. The operating circuit includes contacts *na*2 and *cs*1. Relay LC is a relay that is operated on local calls only, while relay JC is a relay that is not operated on such calls. Continuing to refer to what happens during the last half of the period of duration of the seizing signal, at this time either reed relay RX is operated on its operating winding (I) in a circuit including a rectifier MR12 and contacts *cs*2 and *na*3, or reed relay RY is operated on its operating winding (I) in a circuit including a rectifier MR11 and contacts *cs*2 and *na*3. Relay RX is operated at this time if the called subscriber has an individual (exclusive) line, or if the called subscriber is an X party on a party line, the operation of the relay resulting from the receipt at the link circuit, by way of negative-wire terminal BNE, of a class-of-call signal in the form of a negative battery condition lasting about 5 milliseconds and concurrent with the last half of the seizing signal. Relay RY is operated at this time if the called subscriber is a Y party on a party line, the operation of the relay resulting from the receipt at the link circuit, by way of negative-wire terminal BNE, of a class-of-call signal in the form of a positive battery condition lasting about 5 milliseconds and concurrent with the last half of the seizing signal. For the purposes of the description now being given, it will for the time being be assumed that the called subscriber is an X party on a party line, and that accordingly relay RX is operated. Upon the termination of the seizing signal (at which time the class-of-call signals concerned are also terminated), relay CS releases, but relays NA, H, NB, NC, LC and RX are held operated, the holding winding (II) of relay LC being energised in a circuit over contacts *h*1 and *lc*4, an energising circuit for relay H being maintained by way of contacts *h*1 and *lc*1, and the holding winding (II) of relay RX being energised in a circuit over contacts *h*1.

*bb*8 and *rx*1.—An energising circuit for the slow-operating relay SD is maintained by way of contacts *h*1, *lc*1 and *ba*4. Upon the operation of relay SD (which as previously referred to does not take place until after the termination of the seizing signal), contact *sd*1 disconnects windings (I) of relays NA and CS from terminal AC, and contact *sd*2 disconnects winding (I) of reed relay RA and winding (II) of relay CS from terminal BC and connects this terminal to prepare the link circuit for the reception of a signal signifying the condition (free or busy) of the called subscriber's line. As soon as the exchange apparatus concerned has performed the necessary test to determine this condition (which test may be performed some 15 milliseconds or so after the termination of the seizing signal), then, in the event that the called subscriber's line is free, reed relay LF is operated on its operating winding (I). The operation of relay LF results from the receipt at the link circuit, by way of terminal BC, of a line-condition signal in the form of a negative battery condition lasting about 5 milliseconds. The operating circuit includes contact *h*1, a rectifier MR24, and contacts *nc*3 and *sd*2. The closing of contact *lf*1 completes circuits over contact *h*1 for operating a reed relay BL on its winding (I) and for energising the holding winding (II) of relay LF, the circuit for the last-mentioned winding being one including a resistor R12. The closing of contact *lf*2 completes a circuit, including a rectifier MR22 and contact *nb*3, for applying a busying earth condition to private-wire terminal BP. The closing of contact *lf*3 completes a circuit, including a resistor R16, a rectifier MR20, and contact *nb*4, for applying a holding condition to holding-wire terminal BH. The closing of contact *bl*1 connects earth to terminal AC by way of contacts *nc*2 and *sd*1, to cause the calling subscriber's line to be switched through to the link circuit. The closing of contact *bl*2 short-circuits the winding of a thermal relay TH, which is a relay having a long operating lag (e.g. an operating lag of the order of 5 seconds). Upon the completion of the slow operation of relay G (which may have an operating lag of the order of 75 milliseconds), contact *g*1 opens a point in the circuit of relay TH, and contact *g*2 completes a circuit over back contact *th*1 and a rectifier MR13 for operating a slow-releasing relay BA. Upon the operation of relay BA, contact *ba2* opens the circuit of relay G and closes an operating circuit for reed relay HA, contact *ba4* opens the circuit of relay SD, and contact *ba5* completes a circuit over contacts *h1* and *lf1* for operating a reed relay LFR. Relays G and SD slowly release. Upon the operation of relay HA, a relay LA on the incoming side of the supervisory transmission bridge arrangement is placed under the control of the calling loop across the calling subscriber's line, winding (I) of relay LA being conductively connected to positive-wire terminal APO by way of contact *lc2*, winding (I) of repeating coil BRC, and contacts *ha1* and *na1*, and winding (II) of relay LA being conductively connected to negative-wire terminal ANE by way of contact *lc3*, winding (II) of repeating coil BRC, and contacts *ha2* and *na2*. Relay LA operates. The operation of the relay LFR causes interrupted ringing current to be applied to the called subscriber's line, and ringing tone to be transmitted to the calling subscriber's line. Since (it has been assumed) the called subscriber is an X party on a party line, so that the operated one of relays RX and RY is relay RX, the application of interrupted ringing current to the called subscriber's line is effected in this case, so far as the link circuit is concerned, by the connection of interrupted ringing current supply wire RCSW to negative-wire terminal BNE by way of the operating winding (I) of ring-tripping relay F and contacts *f2*, *lfr3*, *rx3* and *na3*, and the connection of ringing return battery supply wire RRBW to positive-wire terminal BPO by way of a resistor R7 and contacts *f3*, *lfr4*, *rx4* and *nc4*. The transmission of ringing tone to the calling subscriber's line is effected by the connection, by contact *lfr1*, of winding (V) of repeating coil BRC to ringing tone supply wire RTSW by way of contact *f5*. Upon the release of relay G, the falling back of contact *g2* renders the continued operation of relay BA dependent upon the continued operation of contact *la1*.

Assuming that the call is answered, when this happens ring-tripping relay F operates on its operating winding (I), and at its early-break contact *f1* opens the normally-existing short-circuit across its holding winding (II), permitting this holding winding to be energised in a circuit including a resistor R8, and contacts *lfr2*, *bb8*, and *h1*.

The opening of contact *f2* disconnects the called subscriber's line from the source of ringing current, and the changing-over of contact *f3* disconnects the called subscriber's line from ringing return battery and completes a circuit for operating a reed relay HB on its winding (I). The opening of contact *f5* terminates the transmission of ringing tone to the calling subscriber's line. Upon the operation of relay HB, a relay LB on the outgoing side of the supervisory transmission bridge arrangement is placed under the control of the loop across the called subscriber's line, winding (I) of relay LB being conductively connected to positive-wire terminal BPO by way of winding (III) of repeating coil BRC and contacts *hb1* and *nc4*, and winding (II) of relay LB being conductively connected to negative-wire terminal BNE by way of winding (IV) of repeating coil BRC and contacts *hb2* and *na3*. Relay LB operates. The changing over of contact *lb1* completes an operating circuit over back contact *th1* and a rectifier MR14 for a slow-releasing relay BB. Upon the operation of relay BB, contacts *bb3* and *bb4* guard against the subsequent opening of contacts *lf2* and *lf3* respectively, contact *bb5* closes a circuit for holding the relay HB operated on its winding (II), contact *bb7* closes in parallel with contact *h2*, and contact *bb8* opens the holding circuits of relays RX and F, which accordingly release. Upon the release of relay F, the falling back of contact *f4* completes, since contact *bb2* is in its operated condition at this time, a short-circuit across the holding winding (II) of relay LF, with the consequence that relay LF releases. Upon the release of relay LF, the opening of contact *lf1* releases relays LFR and BL. The reversible bridge link circuit is then in the conversational condition.

In the event that, at the end of the call, the called subscriber clears before the calling subscriber, relay LB releases when the called subscriber clears. The falling back of contact *lb1* opens the circuits of relay BB, and completes a circuit over contact *bb1* for operating a slow-releasing relay CB. Upon the operation of relay CB, contact *cb1* closes an alternative circuit for holding the relays NA, NB and NC operated, contact *cb2* closes in parallel with contact *bb4*, and contact *cb3* applies negative battery over a resistor R11 and contact *nb3* to private-wire terminal BP, this application of negative battery being, however, rendered ineffective for the moment by the earth connection over rectifier MR22 and contact *bb3*. Upon the release of relay BB, the opening of contact *bb1* initiates the slow release of relay CB, the opening of contact *bb3* renders the negative battery connection over resistor R11 and contact *cb3* effective for the giving of a signal over terminal BP, the opening of contact *bb5* releases relay HB, and the falling back of contact *bb6* completes a circuit over contacts *g1* and *ba3* and a resistor R9 for the thermal relay TH. Relay CB releases. If, as usually happens, the calling subscriber of the call clears before the thermal relay TH operates, then relay LA releases when the calling subscriber clears, and at its contact *la1* opens the circuit of relay BA and completes a circuit over contact *ba1* for operating a slow-releasing relay CA. Upon the operation of relay CA, contact *ca1* closes an alternative circuit for holding the relays NA, NB and NC operated, and contact *ca3* applies negative battery over a resistor R10 and contact *nb1* to private-wire terminal AP, this application of negative battery being, however, rendered ineffective for the moment by the earth connection over rectifier MR21 and contact *h3*. Contact *ca4* closes an alternative circuit for applying a holding condition to holding-wire terminal AH. Upon the release of relay BA, the opening of contact *ba1* initiates the slow release of relay CA, the falling back of contact *ba2* releases relay HA, and the falling back of contact *ba3* opens the circuit of the thermal relay TH. The closing of contact *ba4* completes, since contact *ca2* is in its operated condition at this time, a short-circuit across the winding of relay H and thereby brings about the release of relay H. The opening of contact *h1* releases relay LC and prevents operation of the slow-operating relay G, and the opening of contact *h3* renders the negative battery connection over resistor R10 and contact *ca3* effective for the giving of a signal over terminal AP. Upon the release of relay CA, the opening of contact *ca1* releases relays NA, NB and NC, and the link circuit assumes its normal condition ready for use on another call. If, however, the calling subscriber of the call does not clear before the thermal relay TH operates, then upon the operation of this relay its contact *th1* brings about an enforced restoration of the link circuit to its normal condition by opening the circuit of relay BA and completing a circuit over a rectifier MR15 and contact *ba1* for operating the slow-releasing relay CA. In this case, the operation of relay CA is followed by the release of relays BA and HA, the opening of the circuit of relay TH, and the release of relays H, LC, CA, NA, NB and NC as just described, the release of relay LA being effected in this case by the opening of contacts *ha1* and *ha2*.

In the event that, at the end of the call, the calling subscriber clears before the called subscriber, relay LA releases when the calling subscriber clears. The falling back of contact *la1* opens the circuit of relay BA and completes a circuit over contact *ba1* for operating the slow-releasing relay CA. Upon the operation of relay CA, contacts *ca1*, *ca3* and *ca4* perform their previously-mentioned functions. Upon the release of relay BA, the opening of contact *ba1* initiates the slow release of relay CA, the falling back of contact *ba2* releases relay HA, the falling back of contact *ba3* completes a circuit for the thermal relay TH, and the closing of contact *ba4* completes, since contact *ca2* is in its operated condition at this time, a short-circuit across the winding of relay H and thereby brings about the release of relay H. The opening of contact *h*1 releases LC and prevents operation of the slow-operating relay G, and the opening of contact *h*3 renders the negative battery connection over resistor R10 and contact *ca* effective for the giving of a signal over terminal AP. Relay CA releases. If, as usually happens, the called subscriber of the call clears before the thermal relay TH operates, then relay LB releases when the called subscriber clears, and at its contact *lb*1 opens the circuit of relay BB and completes a circuit over contact *bb*1 for operating the slow-releasing relay CB. Upon the operation of relay CB, its contacts perform their previously-mentioned functions. Upon the release of relay BB, the opening of contact *bb*1 initiates the slow release of relay CB, the opening of contact *bb*3 renders the negative battery connection over resistor R11 and contact *cb*3 effective for the giving or a signal over terminal BP, the opening of contact *bb*5 releases relay HB, and the falling back of contact *bb*6 opens the circuit of the thermal relay TH. Upon the release of relay CB, the opening of contact *cb*1 releases relays NA, NB and NC, and the link circuit assumes its normal condition ready for use on another call. If, however, the called subscriber of the call does not clear before the thermal relay TH operates, then upon the operation of this relay its contact *th*1 brings about an enforced restoration of the link circuit to its normal condition by opening the circuit of relay BB and completing a circuit over a rectifier MR16 and contact *bb*1 for operating the slow-releasing relay CB. In this case, the operation of relay CB is followed by the release of relays BB and HB, the opening of the circuit of relay TH, and the release of relays CB, NA, NB and NC as just described, the release of relay LB being effected in this case by the opening of contacts *hb*1 and *hb*2.

In the event that the calling subscriber clears during the application of interrupted ringing current to the called subscriber's line in respect of the call, and before the call is answered, then relay LA releases with the reversible bridge link circuit in the condition in which, as regards the other relays of the circuit, the ones that are in the operated condition are NA, H, NB, NC, LC, RX, LF, BL, BA, HA and LFR. In this case, the falling back of contact *la*1 opens the circuit of relay BA, and completes a circuit over contact *ba*1 for operating the slow-releasing relay CA and a circuit over contacts *ba*1 and *lf*4 for operating the slow-releasing relay CB. Upon the operation of relays CA and CB, contacts *ca*1, *ca*3, *ca*4 and *cb*1 perform their previously-mentioned functions, contact *cb*2 closes in parallel with contact *lf*3, and contact *cb*3 applies negative battery over the resistor R11 and contact *nb*3 to private-wire terminal BP, this application of negative battery being, however, rendered ineffective for the moment by the earth connection over rectifier MR22 and contact *lf*2. Upon the release of relay BA, the opening of contact *ba*1 initiates the slow release of relays CA and CB, the falling back of contact *ba*2 releases relay HA, the falling back of contact *ba*3 terminates current flow through resistor R9, and the closing of contact *ba*4 completes, since contact *ca*2 is in its operated condition at this time, a short-circuit across the winding of relay H and thereby brings about the release of relay H. The opening of contact *ba*5 releases relay LFR. The opening of contact *h*1 releases relays RX, LC, LF and BL and prevents operation of the slow-operating relay G, and the opening of contact *h*3 renders the negative battery connection over resistor R10 and contact *ca*3 effective for the giving of a signal over terminal AP. The opening of contact *lf*2 renders the negative battery connection over resistor R11 and contact *cb*3 effective for the giving of a signal over terminal BP. Upon the release of relays CA and CB, the opening of contacts *ca*1 and *cb*1 releases relays NA, NB and NC, and the link circuit assumes its normal condition ready for use on another call.

In the event that the called subscriber's line is busy, instead of being free, when its condition is tested in respect of the call, then as soon as the exchange apparatus concerned has performed the test a read relay BS is operated on its operating winding (I) in a circuit including contact *h*1, a rectifier MR23, and contacts *nc*3 and *sd*2. The operation of relay BS results from the receipt at the link circuit, by way of terminal BC, of a line-condition signal in the form of a positive battery condition lasting about 5 milliseconds. The closing of contact *bs*1 completes a circuit over contact *h*1 for operating the read relay BL on its winding (II) and for energising the holding winding (II) of relay BS. The closing of contact *bs*2 connects winding (V) of repeating coil BRC to busy tone supply wire BTSW, and thereby prepares for the transmission of busy tone to the calling subscriber's line. The closing of contact *bs*3 short-circuits winding (II) of relay LF to guard against false operation and locking-up of this relay. The closing of contact *bl*1 connects earth to terminal AC by way of contacts *nc*2 and *sd*1, to cause the calling subscriber's line to be switched through to the link circuit, and the closing of contact *bl*2 short-circuits the winding of thermal relay TH. Relays G, BA, HA and LA operate in sequence, and busy tone is transmitted to the calling subscriber's line the transmission circuit including contacts *ha*1 and *na*1, and *na*2 and *ha*2.

If the called subscribers of the call, instead of being (as has so far been assumed) an "X" party on a party line, is a "Y" party on a party line, so that (as already explained) during the last half of the period of duration of the seizing signal relay RY is operated instead of relay RX, then upon the termination of the seizing signal relay RY is held operated, its holding winding (II) being energised in a circuit over contacts *h*1, *bb*8 and *ry*1.

In this case, assuming that the called subscriber's line is free, the application of interrupted ringing current to the called subscriber's line is effected, so far as the link circuit is concerned, by the connection of interrupted ringing current supply wire RCSW to positive-wire terminal BPO by way of the operating winding (I) of ring-tripping relay F and contacts *f*2, *lfr*3, *ry*3, and *nc*4, and the connection of ringing return battery supply wire RRBW to negative- wire terminal BNE by way of resistor R7 and contacts *f*3, *lfr*4, *ry*4, and *na*3.

In the event that, for any reason, the incorrect condition arises, following the taking into use of the reversible bridge link circuit for a call, that relays RX and RY are both in the operated condition, then contacts *rx*2 and *ry*2 complete a short-circuit across the winding of relay H and thereby bring about the release of relay H and the consequent restoration of the link circuit to its normal condition.

Dealing now with the operation of the reversible bridge link circuit when it is taken into use for a call from an incoming junction line connected to A-rank switching unit U1 (FIG. 1) to a subscriber's line connected to A-rank switching unit U5 (FIG. 3), that is is taken into use for an incoming junction call in which it is to be used in its non-reversed condition, in this case reed relays NA and CS are operated (by a seizing signal of the form previously mentioned) upon the taking of the link circuit into use. The operation of relay H, the operation of relays NB and NC, the release of relay CS, the operation of relay SD, and the opeartion of relay G occur in sequence as in the case of the call previously considered. During the last half of the period of duration of the seizing signal, reed relay JC is operated on its operating winding (I). The operation of relay JC results from the receipt at the link circuit, by way of positive-wire terminal APO, of a class-of-call signal in the form of a negative battery condition lasting about 5 milliseconds and concurrent with the last half of the seizing signal. The operating circuit includes contacts *na*1 and *cs*3. Relay JC is a relay that is operated on junction calls only. Assuming that the called party is an "X" party on a party line, relay RX is operated, the operation of the relay resulting from the receipt at the link circuit, by way of negative-wire terminal BNE, of a class-of-call signal in the form of a negative battery condition. Upon the termination of the seizing signal and class-of-call signals, relay JC is held operated on its holding winding (II), which is energised in a circuit over contacts *h*1 and *jc*1, and an energising circuit for relays H and SD is maintained by way of contacts *h*1 and *jc*4. In the event that the called subscriber's line is free, relay LF is operated and operates relay BL, all as previously described. The closing of contact *bl*1 connects earth to terminal AC by way of contacts *nc*2 and *sd*1, to cause the calling incoming junction line to be switched through to the link circuit. Upon the completion of the slow operation of relay G, contact *g*2 operates relay BA, with the consequences that contact *ba*2 opens the circuit of relay G and closes an operating circuit for relay HA, contact *ba*4 opens the circuit of relay SD, and contact *ba*5 closes an operating circuit for relay LFR. Upon the operation of relay HA, a relay JA on the incoming side of the supervisory transmission bridge arrangement is placed under the control of the calling loop across the calling incoming junction line, winding (I) of the relay being conductively connected to positive-wire terminal APO by way of contacts *lb*2 and *jc*3, winding (I) of repeating coil BRC, and contacts *ha*1 and *na*1, and winding (II) of the relay being conductively connected to negative-wire terminal ANE by way of contacts *lb*3 and *jc*2, winding ((II) of repeating coil BRC, and contacts *ha*2 and *na*2. Relay JA operates. The operation of relay LFR causes interrupted ringing current to be applied to the called subscriber's line, and ringing tone to be transmitted to the caller, all as previousy described. Upon the release of relay G, the falling back of contact *g*2 renders the continued operation of relay BA dependent upon the continued operation of contact *ja*1.

Assuming that the call is answered, when this happens ring-tripping relay F operates, and brings about the operation of relay HB, all as previously described. Upon the operation of relay HB, the relay LB on the outgoing side of the supervisory transmission bridge arrangement is placed under the control of the loop across the called subscriber's line, and relay LB operates. The changing over of contact *lb*1 completes an operating circuit for relay BB, and the changing over of contacts *lb*2 and *lb*3 reverses the current in the incoming junction line to give an answering supervisory signal over this line. Upon the operation of relay BB, contact *bb*8 releases relays RX and F. The release of relay F brings about the release of relays LF, LFR and BL. The reversible bridge link circuit is then in the conversational condition.

Assuming that, at the end of the call, the called subscriber clears before the calling loop across the calling incoming junction line of the call is opened, relay LB releases when the called subscriber clears. The falling back of contact *lb*1 opens the circuit of relay BB and completes an operating circuit for relay CB. The falling back of contacts *lb*2 and *lb*3 causes the current in the incoming junction line to revert to its initial direction of flow to give a clearing signal over this line. Upon the release of relay BB, the opening of contact *bb*1 initiates the slow release of relay CB, the opening of contact *bb*5 releases relay HB, and the falling back of contact *bb*6 completes a circuit for the thermal relay TH. If, as usually happens, the calling loop across the calling incoming junction line of the call is opened before the thermal relay TH operates, then relay JA releases when this calling loop is opened, and the falling back of contact *ja*1 opens the circuit of relay BA and completes a circuit for operating the slow-releasing relay CA. Upon the release of relay BA, the opening of contact *ba*1 initiates the slow release of relay CA, the falling back of contact *ba*2 releases relay HA, the falling back of contact *ba*3 opens the circuit of the thermal relay TH, and the closing of contact *ba*4 short-circuits the winding of relay H. Relay H releases, and the opening of contact *h*1 releases relay JC. When relay CA releases, the opening of contact *ca*1 releases relays NA, NB and NC, and the link circuit assumes its normal condition ready for use on another call. If, however, the calling loop across the incoming junction line of the call is not opened before the thermal relay TH operates, then upon the operation of this relay its contact *th*1 brings about an enforced restoration of the link circuit to its normal condition by opening the circuit of relay BA and completing a circuit over a rectifier MR15 and contact *ba*1 for operating the slow-releasing relay CA. In this case, the operation of relay CA is followed by the release of relays BA and HA, the opening of the circuit of relay TH, and the release of relays, H, JC, CA, NA, NB and NC as just described, the release of relay JA being effected in this case by the opening of contacts *ha*1 and *ha*2.

When the reversible bridge link circuit is taken into use for a call in which it is to be used in its reversed condition, that is, is taken into use for a local call from a subscriber's line connected to A-rank switching unit U5 (FIG. 3) to a subscriber's line connected to A-rank switching unit U1 (FIG. 1) or is taken into use for a call from an incoming junction line connected to A-rank switching unit U5 to a subscriber's line connected to A-rank switching unit U1, then reed relays RA and CS are operated upon the taking of the link circuit into use. Relay RA is operated on its winding (I) and relay CS is operated on its winding (II), the operation resulting from the receipt at the link circuit, by way of terminal BC, of a seizing signal in the form of an earth condition lasting about 10 milliseconds. Except for the fact that relays RA, RB and RC are operated instead of relays NA, NB and NC, and for the differences occasioned by the reversed connections that result from the operation of contacts *ra*1 to *ra*3, *rb*1 to *rb*4, and *rc*2 to *rc*4 instead of contacts *na*1 to *na*3, *nb*1 to *nb*4, and *nc*2 to *nc*4, the manner of operation of the link circuit on the call is similar to the manner of operation of the link circuit on a corresponding call (local or incoming junction, as the case may be) in which the link circuit is used in its non-reversed condition. The operation of relays RB and RC instead of relays NB and NC results, of course, from the fact that contact *ra*4 is operated instead of contact *na*4.

In the event that, for any reason, the incorrect condition arises, following the taking into use of the reversible bridge link circuit for a call, that relays NC and RC are both in the operated condition, then contacts *nc*1 and *rc*1 complete a short-circuit across the winding of relay H and thereby bring about the release of relay H and the consequent restoration of the link circuit to its normal condition.

Referring now to FIG. 13, this is a circuit diagram illustrating the form taken by the constituent reversible "through" link circuit RTL of the compound link circuit of FIGS. 6 and 7. The reversibility of this link circuit resides in the similarity of its two sides. It provides direct through connections between positive-wire terminal APV and positive-wire terminal BPV, between negative-wire terminal ANV and negative-wire terminal BNV, and between pivate-wire terminal APP and private-wire terminal BPP. On its left-hand (as shown) side, it has a holding relay 13HA, a rectifier MR25, and a resistor R17. Correspondingly, on its other, or right-hand side it has a holding relay 13HB, a rectifier MR26, and a resistor R18. Relays 13HA and 13HB are reed relays.

Dealing by way of example with the operation of the reversible "through" link circuit when it is taken into use for a call from a subscriber's line connected to A-rank switching unit U1 (FIG. 1) to an outgoing junction line connected to A-rank switching unit U5 (FIG. 3) in this case what first happens in the link circuit is that relays 13HA and 13HB are operated on their operating windings (I). This operation of relays 13HA and 13HB results from the receipt at the link circuit, by way of terminal BCC, of a setting signal in the form of an earth condition. The extension, by way of the relevant direct connection in the link circuit, of this earth condition through to terminal ACC causes the calling subscribers line to be switched through to the link circuit. Upon the termination of the setting signal relays 13HA and 13HB remain operated until relay 13HB is released by the removal of a holding earth condition from terminal BHH by the pertinent outgoing junction equipment on the termination of the call. While relays 13HA and 13HB remain operated, the connection of negative battery to terminal BHH by way of resistor R18, rectifier MR26, winding (II) of relay 13HB and contact 13*ha*1 maintains a holding condition on this terminal, and the connection of negative battery to terminal AHH by way of resistor R17, rectifier MR25, winding (II) of relay 13HA, and contact 13*hb*1 maintains a holding condition on terminal AHH.

An important feature of a compound link circuit of the nature exemplified by the one which has been described with reference to FIGS. 6 to 13 of the drawings is that, in the event of circuit failure (e.g., marker or sub-unit failure) affecting only one of a pair of communication path terminal trunks connected to the compound link circuit, the remaining terminal trunk of the pair still has access to both the constituent reversible bridge link circuit and the constituent reversible "through" link circuit. In applying the invention in practice, it may, in order to derive a greater advantage from this feature, be arranged that, as regards as many as is convenient or possible of the relevant pairs of communication path terminal trunks, the two terminal trunks of a pair are connected to different sub-units or, possibily, to parts of the same sub-unit that are served by different markers.

Referring now to FIG. 14, this is a circuit diagram illustrating an alternative form of reversible "through" links circuit for use in a compound link circuit according to the invention. In this alternative form, the terminals 14APV, 14ANV, 14APP, 14AHH, 14ACC, 14BPV, 14BNV, 14BPP, 14BHH and 14BCC correspond respectively to the terminals APV, ANV, APP, AHH, ACC, BPV, BNV, BPP, BHH, and BCC of the form illustrated in FIG. 13. In the case of this alternative form of reversible "through" link circuit, provision is made for the splitting, for a single period if and when required during the process of setting up a call by way of the link circuit, of the through connections comprising the through connection between positive-wire terminal 14APV and positive-wire terminal 14BPV, the through connection between negative-wire terminal 14ANV and negative-wire terminal 14BNV, and the through connection between private-wire terminal 14APP and private-wire terminal 14BPP. The reversibility of the link circuit of FIG. 14 resides in the similarity of its two sides. On its left-hand (as shown) side, it has a holding relay 14HA, a rectifier MR31, and a resistor R13. Correspondingly, on its other, or right-hand side, it has a holding relay 14HB, a rectifier MR32, and a resistor R14. Common to both sides are three relays SP, PS, and SC, five rectifiers MR27 to MR30 and MR33, and a resistor R15. Relays 14HA, 14HB, SP, PS, and SC are reed relays.

Dealing firstly, by way of example, with the operation of the reversible "through" link circuit of FIG. 14 when it is taken into use for a call and the circumstances are such that its left-hand (as shown) side is the calling side and its right-hand side is the called side and splitting as referred to is not required, in this case what first happens in the link circuit is that relays 14HA and 14HB are operated on their operating windings (I). This operation of relays 14HA and 14HB results from the receipt at the link circuit, by way of terminal 14BCC, of a setting signal in the form of an earth condition. The extension, by way of the relevant direct connection in the link circuit, of this earth condition through to terminal 14ACC causes the calling line concerned to be switched through to the link circuit. Upon the operation of relays 14HA and 14HB, contacts 14*ha*1 and 14*hb*1 close in parallel with each other to operate relay SP in an operating circuit that includes resistor R15. Contact *sp*1 completes the through connection between terminals 14APV and 14BPV, contact *sp*2 completes the through connection between terminals 14ANV and 14BNV, and contact *sp*3 completes the through connection between terminals 14APP and 14BPP. Upon the termination of the setting signal, relays 14HA and 14HB remain operated until relay 14HB is released by the removal of a holding earth condition from terminal 14BHH on the termination of the call. Until such removal, relay 14HA is held operated on its holding winding (II) in a circuit that includes resistor R13, rectifier MR31, and contact 14*hb*2, and that is completed over terminal 14AHH, while relay 14HB is held operated on its holding winding (II) in a circuit that includes resistor R14, rectifier MR32, and contact 14*ha*2.

Dealing now, by way of further example, with the operation of the reversible "through" link circuit of FIG. 14 when it is taken into use for a call and the circumstances are such that its left-hand (as shown) side is the calling side and its right-hand side is the called side and splitting as referred to is required, in this case what first happens in the link circuits is that relays 14HA, 14HB and PS are operated on their operating windings (I). This operation of relays 14HA, 14HB and PS results from the receipt at the link circuit, by way of terminal 14BCC, of a setting signal in the form of a positive battery condition. The operating circuit for relay PS includes rectifier MR33. The extension, by way of the relevant direct connection in the link circuit, of this positive battery condition through to terminal 14ACC causes the calling line concerned to be switched through to the link circuit. Upon the operation of relays 14HA, 14HB and PS, contacts 14*ha*1 and 14*hb*1 operate relay SP, and contact *ps*1 connects the winding of relay SC in circuit between earth and terminals 14APP and 14BPP. Contact *sp*1 completes the through connection between terminals 14APV ando 14BPV, contact *sp*2 completes the through connection between terminals 14ANV and 14BNV, contact *sp*3 completes the through connection between terminals 14APP and 14BPP, and contact *sp*4 completes a circuit, including contacts 14*ha*1, 14*hb*1, and *ps*2, for the holding winding (II) of relay PS. Upon the termination of the setting signal, relays 14HA and 14HB remain held operated on their holding windings (II) until relay 14HB is released by the removal of a holding earth condition from terminal 14BHH on the termination of the call. When, during the process of setting up the call, the occasion arises that splitting as referred to becomes necessary, then relay SC is operated as the result of the receipt at the link circuit, by way of terminal 14APP, of a splitting signal in the form of a positive battery condition. The operating circuit for relay SC includes rectifiers MR27 and MR28 and contacts *sp*3 and *ps*1. Contact *sc*2 short-circuits the winding of relay SP and thereby brings about the release of this relay, and contact *sc*3 closes in parallel with contact *ps*1. Upon the release of relay SP, the opening of contacts *sp*1 to *sp*3 effects the requisite splitting, and the opening of contact *sp*4 releases relay PS. The connections over contact *sc*1 and rectifiers MR29 and MR30 serve to ensure that, despite the splitting at contact *sp*3 of the through connection between private-wire terminals 14APP and 14BPP, each of these terminals is maintained at a busying condition (positive battery condition or earth condition) throughout the period of operation of relay SC. Upon the termination of the splitting signal, relay SC releases, whereupon the opening of contact *sc*2 enables relay SP to operate again and terminate the splitting by closing its contacts *sp*1 to *sp*3. With contacts *ps*1 and *sc*3 both open, the winding of relay SC is completely disconnected from the through private-wire connection between terminals 14APP and 14BPP, with the consequence that, so far as the particular call is concerned, any further appearance (e.g. for metering) of a positive battery condition on this through private-wire connection has no effect on relay SC and therefore does not cause splitting.

What we claim is:

1. An automatic telephone exchange system comprising
(a) a first plurality of communication path terminal trunks,
(b) a second plurality of communication path terminal trunks,
(c) at least one link circuit means to which the communication path terminal trunks of said first and second pluralities are connected, said link circuit means comprising
(d) a plurality of individual but dissimilar link circuits, together with
(e) switching means for selectively connecting any particular one of said individual link circuits on one side to any particular one of said first plurality of communication path terminals trunks and on the other side to any particular one of said second plurality of communication path terminal trunks, whereby to link these two communication path terminal trunks together by that particular link circuit.

2. An automatic telephone exchange system comprising
(a) local subscribers' lines,
(b) junction lines,
(c) switching equipment serving local subscribers' lines
(d) switching equipment serving junction lines,
(e) a first pair of communication path terminal trunks having a terminal trunk pertaining to said switching equipment serving local subscribers' lines and a terminal trunk pertaining to said switching equipment serving junction lines,
(f) a second pair of communication path terminal trunks having a terminal trunk pertaining to said switching equipment serving local subscribers' lines and a terminal trunk pertaining to said switching equipment serving junction lines,
(g) at least one link circuit means to which the communication path terminal trunks of said first and second pairs are connected, said link circuit means comprising
(h) an individual link circuit including a supervisory transmission bridge arrangement,
(i) and an individual straight through link circuit providing a d.c. path, and
(j) switching means for selectively connecting either of said individual link circuits on one side to either trunk of said first pair of communication path terminal trunks and on the other side to either trunk of said second pair of communication path terminal trunks whereby either trunk of said first pair of either trunk of said second pair can be linked together by way of that particular link circuit of the link circuit means.

3. An automatic telephone exchange system according to claim 2 in which each of said individual link circuits is reversible.

4. An automatic telephone exchange system as claimed in claim 2 wherein the individual straight through link circuit provides through positive-wire, negative-wire and private-wire connections between its two sides and includes means operable in response to the receipt of a splitting signal at the link circuit for effecting the splitting of these through connections temporarily during the process of setting up a communication path to the link circuit.

References Cited

UNITED STATES PATENTS

| | | |
|---|---|---|
| 2,885,482 | 5/1959 | Baker. |
| 2,769,864 | 11/1956 | Parks. |

KATHLEEN M. CLAFFY, *Primary Examiner.*

LAURENCE A. WRIGHT, *Assistant Examiner.*